United States Patent [19]

Abe

[11] Patent Number: 4,506,640

[45] Date of Patent: Mar. 26, 1985

[54] SYSTEM FOR REGULATING THE IDLE SPEED OF AN INTERNAL COMBUSTION ENGINE

[75] Inventor: Kunihiro Abe, Higashimurayama, Japan

[73] Assignee: Fuji Jukogyo Kabushiki Kaisha, Tokyo, Japan

[21] Appl. No.: 550,886

[22] Filed: Nov. 10, 1983

[30] Foreign Application Priority Data

Nov. 12, 1982 [JP] Japan .................... 57-198760

[51] Int. Cl.³ .................. F02D 11/10; F02D 1/04; F02M 51/06
[52] U.S. Cl. .................... 123/339; 123/585; 123/352
[58] Field of Search ........... 123/339, 327, 585, 478, 123/480, 352

[56] References Cited

U.S. PATENT DOCUMENTS

| 4,237,838 | 12/1980 | Kinugawa et al. | 123/339 |
| 4,365,601 | 12/1982 | Yamazoe et al. | 123/339 |
| 4,367,708 | 1/1983 | Nakamura et al. | 123/339 |
| 4,375,208 | 3/1983 | Furuhashi et al. | 123/339 |
| 4,378,766 | 4/1983 | Yamazoe et al. | 123/339 |
| 4,389,996 | 6/1983 | Yaegashi et al. | 123/585 |
| 4,398,514 | 8/1983 | Nakamura | 123/339 |
| 4,426,968 | 1/1984 | Onuki et al. | 123/339 |
| 4,428,341 | 1/1984 | Hassler et al. | 123/339 |

Primary Examiner—Raymond A. Nelli
Attorney, Agent, or Firm—Martin A. Farber

[57] ABSTRACT

A system for regulating the idle speed of an internal combustion engine with an electronic fuel injection system having a bypass around a throttle valve of the engine and a solenoid operated control valve provided in the bypass to control the volume of air flow passing through the bypass. The system comprises an engine speed sensor for sensing the engine speed of the engine and for producing an engine speed voltage, an idle switch responsive to idle operation of the engine for producing an idle signal, and a reference voltage circuit for producing a reference voltage corresponding to a predetermined idle speed. An operational amplifier is provided having a feedback resistor for producing a control voltage dependent on the difference between the engine speed voltage and the reference voltage. A changeover switch is provided to be responsive to the idle signal for applying the engine speed voltage to the operational amplifier. The control voltage is applied to a driver for energizing the solenoid of the solenoid operated control valve to actuate the control valve to regulate the idle speed to the predetermined idle speed.

8 Claims, 2 Drawing Figures

SYSTEM FOR REGULATING THE IDLE SPEED OF AN INTERNAL COMBUSTION ENGINE

BACKGROUND OF THE INVENTION

The present invention relates to a system for regulating the idle speed of an internal combustion engine with an electronic fuel injection system, and more particularly to a system for adjusting the volume of intake air passing through a bypass around a throttle valve so as to keep the idle speed at a predetermined speed.

Generally, the volume of intake air is measured by an air flow meter provided in an intake passage and converted into an electric air flow signal which is fed to an electronic control unit. The electronic control unit is provided with a feedback control circuit responsive to the air flow signal for producing a control signal. The control signal is applied to a solenoid for a regulator valve provided in the bypass to regulate the idle speed.

A conventional feedback control circuit includes an engine speed sensor, an integrator for comparing the engine speed sensed by the engine speed sensor with a reference value and for producing an output, and a driver responsive to the output of the integrator to energize the solenoid of the regulator valve so as to regulate the idle speed to a predetermined speed. The control operation by such a feedback control circuit inherently is delayed because of the integrating operation, so that a rapid change of the idle speed can not be regulated or hunting of the system occurs.

SUMMARY OF THE INVENTION

The object of the present invention is to provide a system for regulating idle speed which has a high response with a simple construction.

According to the present invention, there is provided a system for regulating the idle speed of an internal combustion engine with an electronic fuel injection system having a bypass around a throttle valve of the engine and a solenoid operated control valve provided in the bypass to control the volume of air flow passing through the bypass, comprising: means for sensing the engine speed of said engine and for producing an engine speed voltage; an idle switch responsive to idle operation of said engine for producing an idle signal;
  a reference voltage circuit for producing a reference voltage corresponding to a predetermined idle speed;
  an operational amplifier having a feedback resistor for producing a control voltage dependent on the difference between said engine speed voltage and said reference voltage;
  switch means responsive to said idle signal for applying said engine speed voltage to said amplifier; and
  a driver responsive to said control voltage for energizing a solenoid of said solenoid operated control valve to actuate said control valve to regulate the idle speed to the predetermined idle speed.

The other objects and features of this invention will be apparently understood from the following description with reference to the accompanying drawings hereinafter.

DETAILED DESCRIPTION OF THE PREFERRED EMBODIMENT

Figure 1:
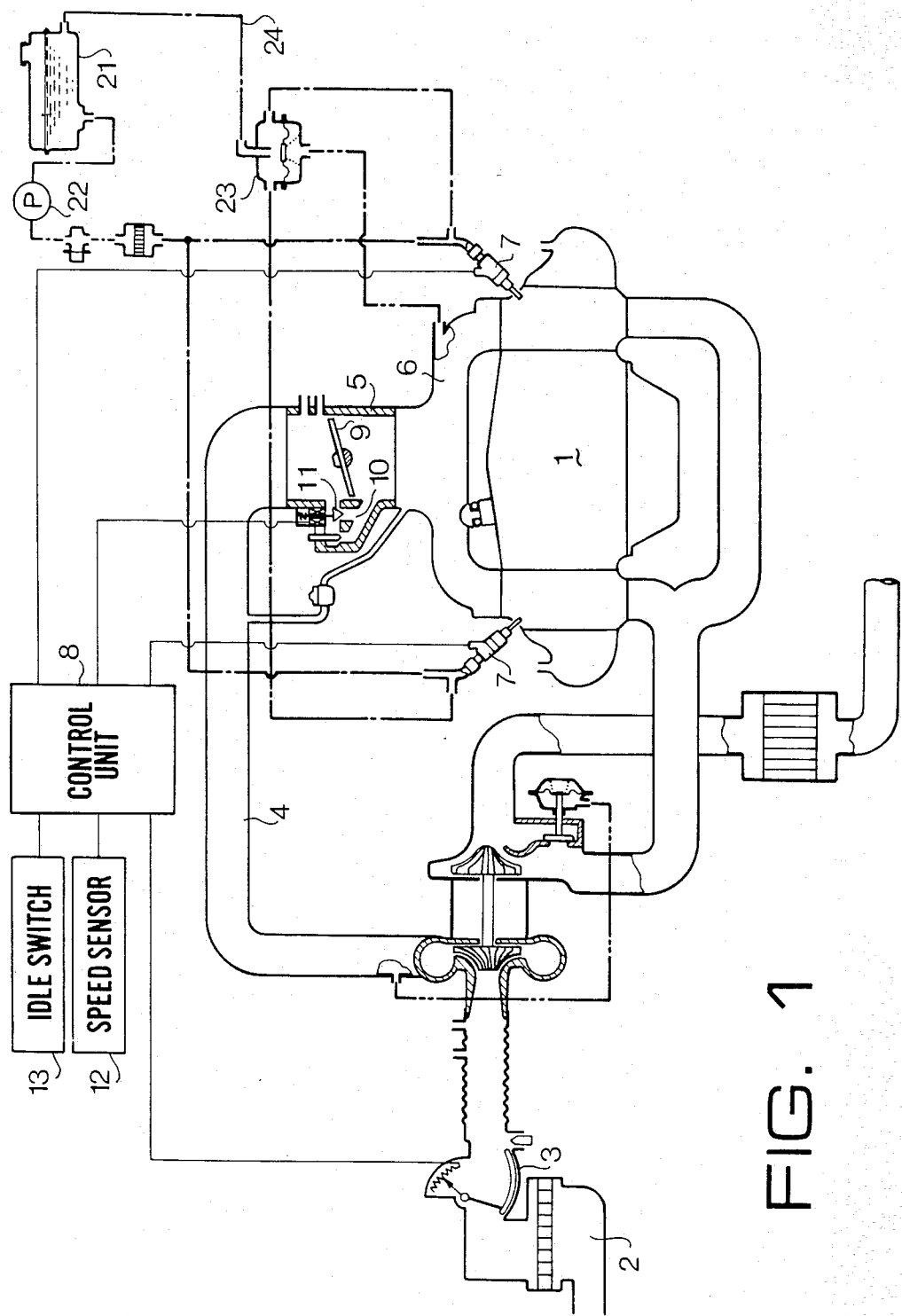
FIG. 1 is a schematic view showing an embodiment of the present invention.

Referring to FIG. 1, an engine 1 is an opposed-four-cylinder type engine and is provided with an intake pipe 4 and manifold 6. Four fuel injection valves 7 are provided one on each branch of the intake manifold for every cylinder. Each fuel injection valve 7 supplies fuel to the cylinder from a fuel tank 21 by a fuel pump 22 and surplus fuel returns to the fuel tank 21 through a pressure regulator 23 and a conduit 24. Opening and closing of the fuel injection valves 7 are controlled by a control signal from an electronic control unit 8. The control unit 8 is applied with signals from an air flow meter 3, a coolant temperature sensor (not shown) and other signals in order to control the fuel injection.

A bypass 10 is provided around a throttle valve 9 in the throttle body 5. A control valve 11 is provided in the bypass 10 to control the volume of air flow passing therethrough. The electronic control unit 8 is applied with an idle signal from an idle switch 13 when idling and with an engine speed signal from an engine speed sensor 12 for operating the control valve 11.

Figure 2:
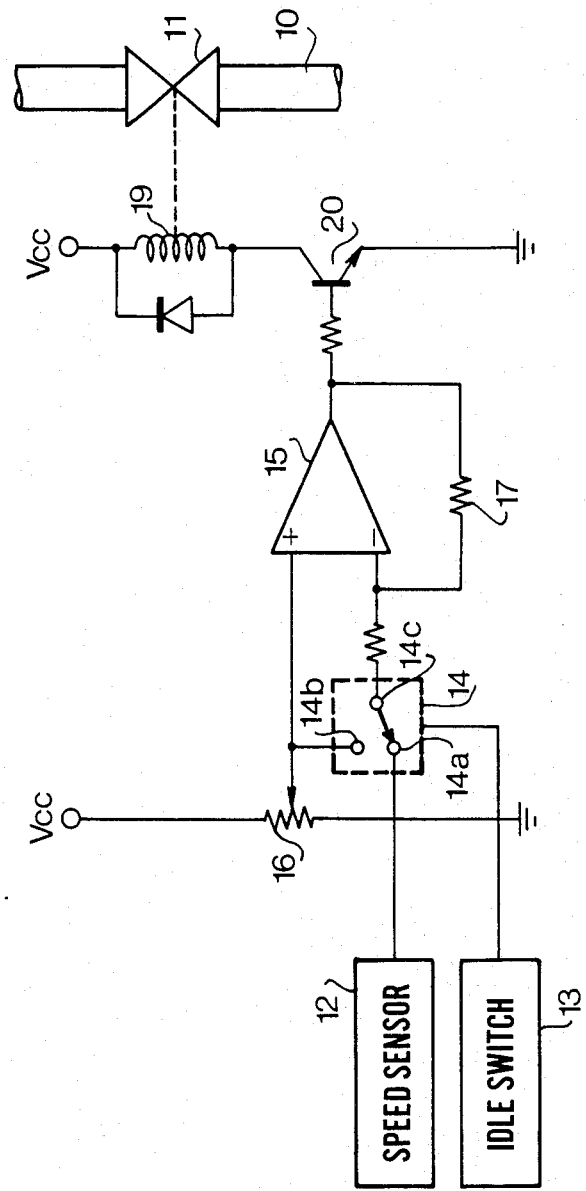
FIG. 2 is a feedback control circuit according to the present invention.

Referring to FIG. 2, the engine speed sensor 12 is responsive to ignition pulses to produce the engine speed signal, and the idle switch 13 is operated by an accelerator pedal (not shown) of a vehicle to produce the idle signal at the idling position of the accelerator pedal, when the throttle valve 9 is closed. The output of the idle switch 13 is connected to a control gate of a change-over switch 14 to change connections between contacts 14a and 14b. The output of the engine speed sensor 12 is connected to the contact 14a. A movable contact 14c of the change-over switch 14 is connected to an inverting input of an operational amplifier (opamp) 15 with a feedback resistor 17. In order to give a reference idle speed voltage, a variable resistor 16 is provided, a slider of which is electrically connected to the contact 14b and to the non-inverting input of the opamp 15. The output of the opamp 15 is connected to a base of a transister 20 of a driver. The transistor 20 is provided in a circuit of a solenoid 19 for actuating the control valve 11.

In operation, in idling conditions, the output of the idle switch 13 causes the movable contact 14c to connect with the contact 14a, so that the output of the engine speed sensor 12 is applied to the opamp 15. When the engine idle speed is equal to a predetermined idle speed, the voltage at the inverting input of the opamp 15 is equal to that of the non-inverting input. Accordingly, the output of opamp 15 is zero and the transistor 20 is off, so that the control valve 11 is its closed state.

When the idle speed decreases because of an increase of electric load such as head lights, the voltage at the inverting input of the opamp 15 drops. Accordingly, the input voltage of the opamp rises to render the transistor 20 conductive. Thus, the solenoid 19 is energized to open the control valve 11 so as to increase the volume of air flow passing through the bypass 10. As a result, the output of the air flow meter 3 increases, so that the control signal of the electric control unit 8 varies to increase the amount of fuel injected from the injection valves 7. Thus, the engine idle speed is increased. When the idle speed rises to the predetermined engine speed, the transistor 20 is turned off to close the control valve 11.

When the accelerator pedal is depressed, the output of the idle switch 13 changes to a low level thereby switching the contact of the movable contact 14c to the contact 14b. Thus, the output of the opamp 15 goes to a low level, so that the transistor 20 becomes non-conductive to close the control valve 11.

From the foregoing it will be understood that the present invention provides a system for regulating the idle speed in which an integrator is not provided, so that rapid response can be obtained and hunting of the system can be prevented.

While the presently preferred embodiment of the present invention has been shown and described, it is to be understood that this disclosure is for the purpose of illustration and that various charges and modifications may be made without departing from the spirit and scope of the invention as set forth in the appended claims.

What is claimed is:

1. A system for regulating the idle speed of an internal combustion engine with an electronic fuel injection system having a bypass around a throttle valve of the engine and a solenoid operated control valve provided in the bypass to control the volume of air flow passing through the bypass, comprising:
    means for sensing the engine speed of said engine and for producing an engine speed voltage;
    an idle switch responsive to idle operation of said engine for producing an idle signal;
    means comprising a reference voltage circuit for producing a reference voltage corresponding to a predetermined idle speed;
    an operational amplifier having a feedback resistor for producing a control voltage dependent on the difference between said engine speed voltage and said reference voltage;
    switch means responsive to said idle signal for applying said engine speed voltage to said operational amplifier; and
    a driver responsive to said control voltage for energizing a solenoid of said solenoid operated control valve to actuate said control valve to regulate the idle speed to the predetermined idle speed.

2. The system for regulating the idle speed according to claim 1, wherein
    said driver comprises means comprising a transistor for converting said control voltage to a control current for activating said solenoid, said solenoid acting to open said solenoid operated control valve upon an increase in said control current to a predetermined magnitude, said solenoid acting to close said solenoid operated control valve upon a decrease of said control current to another predetermined magnitude.

3. The system for regulating the idle speed according to claim 1, wherein
    said feedback resistor is connected from an output of said operational amplifier to one input of said operational amplifier.

4. The system for regulating the idle speed according to claim 3, further comprising
    a resistor connected between said one input of said operational amplifier and said switch means.

5. The system for regulating the idle speed according to claim 4, wherein
    said switch means further for connecting both inputs of said operational amplifier to said reference voltage when the idle switch does not produce said idle signal.

6. The system for regulating the idle speed according to claim 3, wherein
    said engine speed voltage is supplied to said one input of said operational amplifier.

7. The system for regulating the idle speed according to claim 6, wherein
    one input of said operational amplifier is an inverting input.

8. The system for regulating the idle speed according to claim 7, further comprising
    a resistor connected between said one input of said operational amplifier and said switch means.

* * * * *